(12) United States Patent
Lin et al.

(10) Patent No.: US 8,916,507 B2
(45) Date of Patent: Dec. 23, 2014

(54) FOAMING AGENT FOR SUBTERRANEAN FORMATIONS TREATMENT, AND METHODS OF USE THEREOF

(75) Inventors: Lijun Lin, Sugar Land, TX (US); Carlos Abad, Richmond, TX (US); Bruno Drochon, Missouri City, TX (US); Gregory Kubala, Houston, TX (US); Laura Shafer, Kuala Lumpur (MY); Alejandro Pena, Ciudad Ojeda (VE); Ramsey Buoy, Pasadena, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 8 days.

(21) Appl. No.: 13/167,808

(22) Filed: Jun. 24, 2011

(65) Prior Publication Data

US 2011/0251111 A1 Oct. 13, 2011

Related U.S. Application Data

(63) Continuation of application No. 11/844,093, filed on Aug. 23, 2007, now Pat. No. 7,998,909.

(51) Int. Cl.
*C09K 8/60* (2006.01)
*C09K 8/536* (2006.01)
*C09K 8/70* (2006.01)
*C09K 8/74* (2006.01)
*C09K 8/68* (2006.01)
*C09K 8/90* (2006.01)
*C09K 8/94* (2006.01)

(52) U.S. Cl.
CPC .................. *C09K 8/536* (2013.01); *C09K 8/703* (2013.01); *C09K 8/74* (2013.01); *C09K 8/68* (2013.01); *C09K 8/90* (2013.01); *C09K 2208/26* (2013.01); *C09K 8/905* (2013.01); *C09K 8/94* (2013.01)

USPC ........... 507/202; 507/211; 507/217; 507/219; 507/254; 507/267; 507/271; 507/273; 507/276

(58) Field of Classification Search
None
See application file for complete search history.

(56) References Cited

U.S. PATENT DOCUMENTS

| | | | | |
|---|---|---|---|---|
| 3,185,217 A | * | 5/1965 | Brooks, Jr. et al. | 166/305.1 |
| 3,219,115 A | * | 11/1965 | Hower et al. | 175/69 |
| 3,223,163 A | | 12/1965 | Koch et al. | |
| 3,421,582 A | | 1/1969 | Fallgatter | |

(Continued)

FOREIGN PATENT DOCUMENTS

| | | |
|---|---|---|
| EP | 0899415 | 3/1999 |
| WO | 9856497 | 12/1998 |

*Primary Examiner* — John J Figueroa
(74) *Attorney, Agent, or Firm* — Jeremy D. Tillman; Rachel E. Greene; Tim Curington

(57) ABSTRACT

A wellbore treatment fluid is formed from an aqueous medium, a gas component, a viscosifying agent, and a surfactant. The surfactant is represented by the chemical formula:

$$[R—(OCH_2CH_2)_m—O_q—YO_n]_pX$$

wherein R is a linear alkyl, branched alkyl, alkyl cycloaliphatic, or alkyl aryl group; O is an oxygen atom; Y is either a sulfur or phosphorus atom; m is 1 or more; n is a integer ranging from 1 to 3; p is a integer ranging from 1 to 4; q is a integer ranging from 0 to 1; and X is a cation. The fluid may be used in treating a subterranean formation penetrating by a wellbore by introducing the fluid into the wellbore. The fluid may be used in fracturing a subterranean formation penetrated by a wellbore by introducing the fluid into the formation at a pressure equal to or greater than the fracture initiation pressure.

20 Claims, 10 Drawing Sheets

(56) References Cited

U.S. PATENT DOCUMENTS

| | | | |
|---|---|---|---|
| 3,640,877 A * | 2/1972 | Gobert | 510/305 |
| 3,692,676 A | 9/1972 | Culter et al. | |
| 3,937,283 A | 2/1976 | Blauer et al. | |
| 4,152,290 A * | 5/1979 | Flournoy et al. | 516/59 |
| 4,181,634 A * | 1/1980 | Kennedy et al. | 510/122 |
| 4,709,759 A * | 12/1987 | Bock et al. | 166/275 |
| 5,026,735 A * | 6/1991 | Stern | 521/50 |
| 5,881,493 A | 3/1999 | Restive | |
| 5,899,212 A | 5/1999 | Sorensen et al. | |
| 6,572,843 B1 | 6/2003 | Sorensen et al. | |
| 7,510,011 B2 | 3/2009 | Le Gloahec et al. | |
| 2003/0139297 A1 | 7/2003 | Quintero | |
| 2004/0121916 A1 | 6/2004 | Kono et al. | |
| 2004/0209780 A1 | 10/2004 | Harris et al. | |
| 2006/0247345 A1 | 11/2006 | Rainio | |
| 2008/0006413 A1 | 1/2008 | Le Gloahec et al. | |

\* cited by examiner

FOAMING AGENT FOR SUBTERRANEAN FORMATIONS TREATMENT, AND METHODS OF USE THEREOF

This application is a continuation application of U.S. patent application Ser. No. 11/844,093, filed Aug. 23, 2007, entitled, "Foaming Agent for Subterranean Formations Treatment and Methods of Use Thereof," and incorporated by reference herein in its entirety. This application claims the benefit of U.S. Provisional Patent Application No. 60/827,324, filed Sep. 28, 2006, which is incorporated herein by reference in its entirety.

BACKGROUND OF THE INVENTION

This invention relates to fluids used in treating a subterranean formation. In particular, the invention relates to aqueous energized wellbore treatment fluids, and methods of forming and using such fluids.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like.

Fluid technologies incorporating a gaseous component or a supercritical fluid to form a foam or energized fluid are commonly used in the stimulation of oil and gas wells. For example, some viscoelastic fluids used as fracturing fluids contain a gas such as air, nitrogen or carbon dioxide to provide an energized fluid or foam. Such fluids are commonly formed by injecting an aqueous solution ("base fluid") concomitantly with a gas, most commonly nitrogen, carbon dioxide or their mixtures, into the formation. Among other benefits, the dispersion of the gas into the base fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the base fluid from the interstices of the formation and of the proppant pack into the wellbore, due to the expansion of such gas once the pressure is reduced at the wellhead at the end of the fracturing operation. Other common uses of foams or energized fluids include wellbore cleanout, gravel packing, acid diversion, fluid loss control, and the like.

Foamed and energized fracturing fluids invariably contain "foamers", most commonly surfactants or blends of surfactants that facilitate the dispersion of the gas into the base fluid in the form of small bubbles or droplets, and confer stability to the dispersion by retarding the coalescence or recombination of such bubbles or droplets. Foamed and energized fracturing fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

The ability to formulate stable energized fluids with rheological properties suitable for fracturing operations becomes increasingly difficult as the temperature of the subterranean formation increases. The matter is worsened when carbon dioxide is present in the gas phase, since carbon dioxide exhibits high solubility in aqueous solutions. The high solubility of carbon dioxide facilitates mass transfer between bubbles and accelerates foam-destabilizing mechanisms such as so-called Ostwald ripening, which ultimately lead to phase separation and to the loss of fluid viscosity. Furthermore, carbon dioxide reacts with water to form carbonic acid. The formation of carbonic acid imposes a low pH environment for the fluid (typically in the range 3.5-4), thus impeding the necessary control of pH for efficient crosslinking with borate ions and often with other metallic ions. Exposure to low pH and high temperatures promotes degradation of the polymeric chains, particularly if polysaccharides are used as viscosifying agents, thus contributing to the referred loss of foam stability and viscosity.

The need to identify suitable chemicals to formulate viscous foams and energized fluids containing carbon dioxide, particularly at elevated temperatures in excess of about 93° C., and more particularly at temperatures in excess of about 121° C., particularly using $CO_2$ or $N_2$, is known to those skilled in the art. Furthermore, there are needs for improved methods to utilize such formulations in the treatment and fracturing of subterranean formations penetrated by a wellbore.

Due to the relatively high cost associated with the foaming agents, there also exists a need to identify efficient surfactants that generate stable foams at reduced cost. A fluid that can achieve the above would be highly desirable. These needs are met at least in part by the following invention.

SUMMARY OF THE INVENTION

The invention provides a wellbore treatment fluid comprising an aqueous medium, a gas component, a viscosifying agent, and a surfactant, wherein the surfactant is represented by the chemical formula:

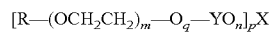

$$[R-(OCH_2CH_2)_m-O_q-YO_n]_pX$$

wherein R is a linear alkyl, branched alkyl, alkyl cycloaliphatic, or alkyl aryl group; O is an oxygen atom; Y is either a sulfur or phosphorus atom; m is 1 or more; n is an integer ranging from 1 to 3; p is an integer ranging from 1 to 4; q is an integer ranging from 0 to 1; and X is a cation.

The invention also provides a method of fracturing a subterranean formation penetrating by a wellbore, including the steps of preparing a fluid comprising an aqueous medium, a gas component, a viscosifying agent, and a surfactant, wherein the surfactant is represented by the chemical formula:

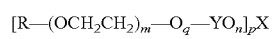

$$[R-(OCH_2CH_2)_m-O_q-YO_n]_pX$$

wherein R is a linear alkyl, branched alkyl, alkyl cycloaliphatic, or alkyl aryl group; O is an oxygen atom; Y is either a sulfur or phosphorus atom; m is 1 or more; n is a integer ranging from 1 to 3; p is a integer ranging from 1 to 4; q is a integer ranging from 0 to 1; and X is a cation, and introducing the fluid into the formation at a pressure equal to or greater than the fracture initiation pressure.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
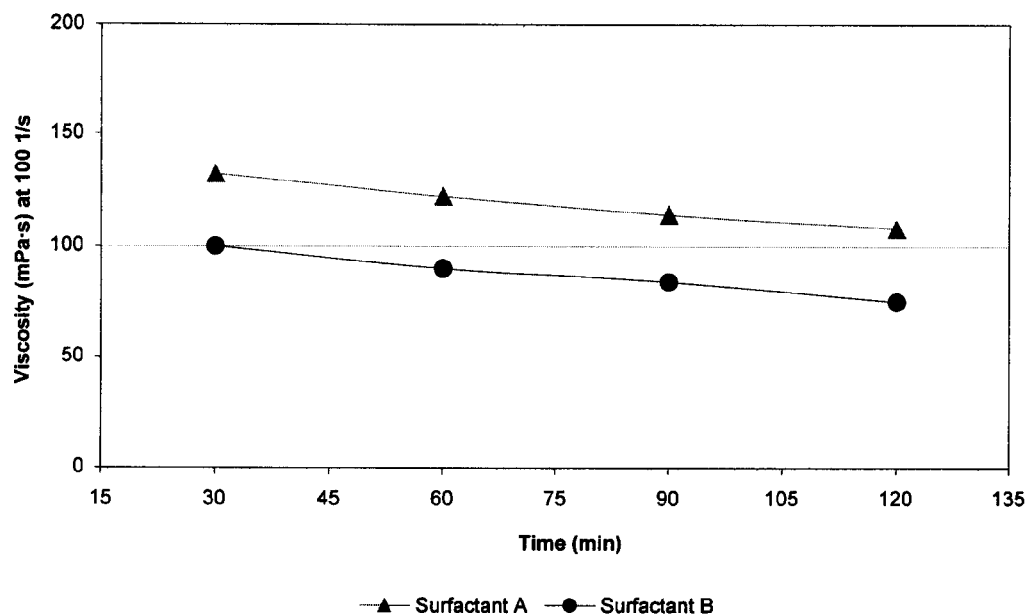
FIG. 1 shows the viscosities over time of $N_2$ foamed guar-based fluids at about 120° C. containing either Surfactant A (a sodium tridecyl ether sulfate containing surfactant) or Surfactant B (an ammonium C6-C10 alcohol ethoxysulfate containing surfactant)

The description and examples are presented solely for the purpose of illustrating the different embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a range, such as a concentration range, listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even if no data points within the range, are explicitly identified or refer to only a few specific data points, it is to be understood that inventors appreciate and understand that any and all data points within the range are to be considered to have been specified, and that inventors are in possession of the entire range and all points within the range.

As used herein, the term "liquid phase" is meant to include all components of the fluid except the gas phase. The term "gas" is used herein to describe any fluid in a gaseous state or in a supercritical state, wherein the gaseous state refers to any state for which the temperature of the fluid is below its critical temperature and the pressure of the fluid is below its vapor pressure, and the supercritical state refers to any state for which the temperature of the fluid is above its critical temperature. As used herein, the terms "energized fluid" and "fluid" are used interchangeably to describe any stable mixture of gas phase and liquid phase, including foams, notwithstanding the foam quality value, i.e. the ratio of gas volume to the total volume of gas and liquid phases.

The invention relates to well treatment energized fluid compositions and methods related thereto. The fluid typically comprises an aqueous medium, a viscosifying agent, a surfactant, and a gas component. The fluid can further contain a suitable crosslinking agent, a gel breaker, an electrolyte, and other desirable additives, as needed. The energized fluids have adequate rheology for good proppant suspension and transport properties, and also exhibit excellent stability over a wide range of temperatures.

Energized fluids are often used in the stimulation of oil and gas wells, and are formed and applied by injecting an aqueous solution concomitantly with a gas (most commonly nitrogen, carbon dioxide or their mixtures). The dispersion of the gas into the base fluid in the form of bubbles increases the viscosity of such fluid and impacts positively its performance, such as the ability to effectively induce hydraulic fracturing of the formation, and also the capacity to carry solids, such as proppants. The presence of the gas also enhances the flowback of the fluid. It is commonly known that stable energized fluids or foams with rheology properties suitable for oilfield operations becomes increasingly difficult when the formation temperature is above 120° C., or even up to 150° C.

Fluid compositions and methods of the invention are useful in oilfield operations, including such operations as fracturing subterranean formations, modifying the permeability of subterranean formations, fracture or wellbore cleanup, acid fracturing, matrix acidizing, gravel packing or sand control, and the like. Another application includes the placement of a chemical plug to isolate zones or to assist an isolating operation.

Some surfactants useful for forming the energized fluids useful in the invention are based upon the following general chemical structure (I):

$$[R-(OCH_2CH_2)_m-O_q-YO_n]_p X \qquad (I)$$

wherein R is a linear alkyl, branched alkyl, alkyl cycloaliphatic, or alkyl aryl (such as alkyl phenyl) group, which may contain from about 6 carbon atoms to about 30 carbons, more particularly from about 10 carbons to about 20 carbon atoms (i.e. 11, 12, 13, 14, 15, 16, 17, 18 or 19, etc. carbon atoms); O is an oxygen atom; Y is either a sulfur or phosphorus atom; m represents the average number of ethylene oxide groups and is 1 or more, more particularly m is 1 to about 6; n is an integer ranging from 1 to 3; p is an integer ranging from 1 to 4; q is an integer ranging from 0 to 1; and X is a cation. The average number of ethylene oxide groups ($OCH_2CH_2$) can vary. For example, a surfactant that contains 3 moles of ethylene oxide, may be a mixture of surfactants with 1, 2, 3 and/or 4 ethylene oxide groups. The length of the alkyl group may preferably range from about 12 carbon atoms up to about 14 carbon atoms. Any suitable cation, X, may be used, including, but not limited to, aluminum ($Al^{3+}$), iron ($Fe^{3+}$), titanium ($Ti^{4+}$), zirconium ($Zr^{4+}$), ammonium ($NH_4^+$), lithium ($Li^+$), magnesium $Mg(^{2+})$, calcium ($Ca^{2+}$), potassium ($K^+$), hydrogen ($H^+$), sodium ($Na^+$), and the like. A mixture of surfactants represented by the above structure may also be used according to some embodiments of the invention. One particularly useful surfactant is sodium tridecyl ether sulfate, which is represented by the following structure (II):

$$C_{13}H_{27}(OCH_2CH_2)_m-O-SO_3^- Na^+ \qquad (II)$$

where m ranges from about 1 to about 4. This surfactant is available under such trade names as CEDEPAL® TD-403MF-LD, CEDEPAL® TD-403MK-LD, CEDEPAL® TD-407, CEDEPAL® TDS 484, Genapol® XRO, Liposurf EST-30, POLYSTEP® B-40, POLYSTEP® B-41, Rhodapex® EST-30, Rhodapex® EST-30/BLB, Rhodapex® EST-30/SBL, Rhodapex® EST/30-SK, Stanfax 1020, or Sulfochem® TD-3. Another useful surfactant is a mixture of sodium dodecyl ether sulfate (III) and sodium tetradecyl ether sulfate (IV), which are represented by the following structures (III) and (IV):

$$C_{12}H_{25}(OCH_2CH_2)_m-O-SO_3^- Na^+ \qquad (III)$$

$$C_{14}H_{29}(OCH_2CH_2)_m-O-SO_3^- Na^+ \qquad (IV)$$

In some other embodiments, the alkylene oxide group of the surfactant structure may be a ethylene oxide, propylene oxide (V), or any mixture thereof (VI and VII given as non-limiting examples), as represented by the following:

$$[R-(OCH_2CH(CH_3))_1-O_q-YO_n]_p X \qquad (V)$$

$$[R-(OCH_2CH_2)_m(OCH_2CH(CH_3))_1-O_q-YO_n]_p X \qquad (VI)$$

$$[R-(OCH_2CH(CH_3))_1(OCH_2CH_2)_m-O_q-YO_n]_p X \qquad (VII)$$

wherein R, O, Y, m, n, p, q and X are the same as defined above; 1 represents the average number of propylene oxide groups and ranges from 1 or more, more particularly from about 1 to about 6. The ethylene oxide and propylene oxide groups may be in a random or blocked configuration.

Another useful surfactant according to the invention ammonium nonoxynol-4 sulfate, or ammonium sulfate of nonylphenol ether(4) sulfate as represented by the formula (VIII):

$$C_9H_{19}-C_6H_4-(C_2H_4O)_x-O-SO_3^-.NH_4^+ \qquad (VIII)$$

available under such trade names as Abex® EP-100, Ablusol NP4SF, POLYSTEP® B-1, Rhodapex® CO-436, or Sulfochem® 436, for example. Yet other useful surfactants include other sodium or ammonium alkylaryl ethoxy sulfates, PEG isodecyl ether phosphate which is available as Rhodafac® BG-510, or deceth-4 phosphate which is available as CEDEPHOS® FA600, DePHOS RA-60, DePHOS RA-75, Monafax® 831, Monafax® 1214, Rhodafac® RA-600, or Rhodafac® RA/600-E.

The aqueous medium of fluids useful of the invention may be water or brine. Where the aqueous medium is a brine, the brine is water comprising an inorganic salt(s), organic salt(s), or mixture(s) thereof. Preferred inorganic salts include alkali metal halides, more preferably potassium chloride or ammonium chloride. The carrier brine phase may also comprise an organic salt more preferably sodium or potassium formate, or tetra-methyl ammonium chloride. Preferred inorganic divalent salts include calcium halides, more preferably calcium chloride or calcium bromide. Sodium bromide, potassium bromide, or cesium bromide may also be used.

Fluids useful in the invention include a viscosifying agent that may be a polymer that is either crosslinked or linear, or any combination thereof. Polymer based viscosifying agents useful in the fluids include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as viscosifying agents as well. Synthetic polymers, including but not limited to, polyacrylamide and polyacrylate polymers and copolymers, are used typically for high-temperature applications. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published U.S. Pat. App. No. US 2004/0209780, Harris et. al.

In some method embodiments, the viscosifying agent is a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups may be about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Galactomannans may comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. The branches may be monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans may be used. In various embodiments, legume seed galactomannans can be used, examples of which include, but are not limited to: tara gum (e.g., from Cesalpinia spinosa seeds) and guar gum (e.g., from Cyamopsis tetragonoloba seeds). In addition, although embodiments of the present invention may be described or exemplified with reference to guar, such as by reference to hydroxy-$C_1$-$C_4$-alkyl guars, such descriptions apply equally to other galactomannans, as well.

In one embodiment, the polymer is a diutan gum having a tetrasaccharide repeating unit in the polymer backbone as represented by the chemical formula (IX):

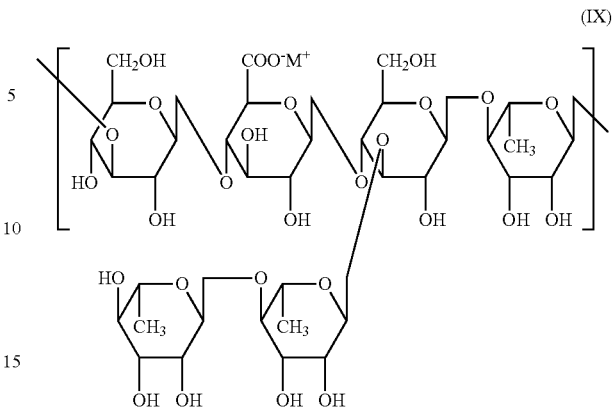

(IX)

wherein $M^+$ is an ionic species, and the weight average molecular weight (Mw) is from about $10^5$ to about $10^7$.

When incorporated, the polymer based viscosifying agent may be present at any suitable concentration. In various embodiments hereof, the gelling agent can be present in an amount of from about 1 pound (0.4 kg) to less than about 60 pounds (27.2 kg) per thousand gallons (3785 liters) of liquid phase, or from about 15 pounds (6.8 kg) to less than about 40 pounds (18.1 kg) per thousand gallons (3785 liters), from about 15 pounds (6.8 kg) to about 35 pounds (15.9 kg) per thousand gallons (3785 liters), 15 pounds (6.8 kg) to about 25 pounds (11.3 kg) per thousand gallons (3785 liters), or even from about 17 pounds (7.7 kg) to about 22 pounds (10 kg) per thousand gallons (3785 liters). Generally, the gelling agent can be present in an amount of from about 10 pounds (4.5 kg) to less than about 60 pounds (27.2 kg) per thousand gallons (3785 liters) of liquid phase, with a lower limit of polymer being no less than about 1 pound (0.4 kg), 2 pounds (0.9 kg), 3 pounds (1.4 kg), 4 pounds (1.8 kg), 5 pounds (2.3 kg), 6 pounds (2.7 kg), 7 pounds (3.2 kg), 8 pounds (3.61 kg), 9 pounds (4.1 kg), 10 pounds (4.5 kg), 11 pounds (5.0 kg), 12 pounds (5.4 kg), 13 pounds (5.9 kg), 14 pounds (6.3 kg), 15 pounds (6.8 kg), 16 pounds (7.2 kg), 17 pounds (7.7 kg), 18 pounds (8.1 kg), or 19 pounds (8.6 kg) per thousand gallons (3785 liters) of the liquid phase, and the upper limited being less than about 60 pounds (27.2 kg) per thousand gallons (3785 liters), no greater than 59 pounds (26.8 kg), 54 pounds (24.5 kg), 49 pounds (22.2 kg), 44 pounds (20.0 kg), 39 pounds (17.7 kg), 34 pounds (15.4 kg), 30 pounds (13.6 kg), 29 pounds (13.2 kg), 28 pounds (12.7 kg), 27 pounds (12.3 kg), 26 pounds (11.8 kg), 25 pounds (11.4 kg), 24 pounds (10.9 kg), 23 pounds (10.4 kg), 22 pounds (10.0 kg), 21 pounds (9.5 kg), or 20 pounds (9.1 kg) per thousand gallons (3785 liters) of the liquid phase. In some embodiments, the polymers can be present in an amount of about 20 pounds (9.1 kg) per thousand gallons (3785 liters). Hydroxypropyl guar, carboxymethyl hydroxypropyl guar, carboxymethyl guar, cationic functional guar, guar or mixtures thereof, are particularly useful polymers for use herein as a gelling agent. Fluids incorporating polymer based viscosifying agents preferably have a viscosity value of at least about 50 centipoise (50 mPa·s) at a shear rate of about 100 $s^{-1}$, at treatment temperature. The polymer based viscosifying agent may be introduced in any practical form, including a slurry, powdered, pre-hydrated, hydrated, and the like.

The gas component of the fluids of the present invention may be produced from any suitable gas that forms an energized fluid or foam when introduced into the aqueous medium. See, for example, U.S. Pat. No. 3,937,283 (Blauer et al.), incorporated herein by reference. The gas component may comprise a gas selected from nitrogen, air, argon, carbon dioxide, and any mixtures thereof. Particularly useful are the gas components of nitrogen or carbon dioxide, in any quality readily available. The gas component may assist in the fracturing and acidizing operation, as well as the well clean-up process. The fluid may contain from about 10% to about 90% volume gas component based upon total fluid volume percent, more particularly from about 20% to about 80% volume gas component based upon total fluid volume percent, and more particularly from about 30% to about 70% volume gas component based upon total fluid volume percent.

In some embodiments, the fluids used may further include a crosslinker Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, antimony and zirconium.

In certain embodiments, the fluids may include a biocide. It has been found that inclusion of a biocide can increase the energized fluid viscosity. Examples of suitable biocides include 2,2-dibromo-3-nitrilopropionamine and 1,2-benzisothiazolin-3-one. The biocide may be used in an amount of from about 0.001% by weight to about 1% by weight of the treatment fluid.

The fluids used in some method embodiments of the invention may include an electrolyte which may be an organic acid, organic acid salt, organic salt, or inorganic salt. Mixtures of the above members are specifically contemplated as falling within the scope of the invention. This member will typically be present in a minor amount (e.g., less than about 30% by weight of the liquid phase).

The organic acid is typically a sulfonic acid or a carboxylic acid, and the anionic counter-ion of the organic acid salts is typically a sulfonate or a carboxylate. Representatives of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Particularly useful organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In some embodiments of the invention, the electrolyte is an organic salt such as tetramethyl ammonium chloride, or inorganic salt such as potassium chloride. The electrolyte may be used in an amount of from about 0.01 wt % to about 12.0 wt % of the total liquid phase weight, and more particularly from about 0.1 wt % to about 8.0 wt % of the total liquid phase weight.

Fluids used in some embodiments of the invention may also comprise an organoamino compound. Examples of suitable organoamino compounds include, but are not limited to, tetraethylenepentamine, triethylenetetramine, pentaethylenehexamine, triethanolamine, and the like, or any mixtures thereof. When organoamino compounds are used in fluids of the invention, they may be incorporated in an amount from about 0.01 wt % to about 2.0 wt % based on total liquid phase weight, more particularly, the organoamino compound may be incorporated at an amount from about 0.05 wt % to about 1.0 wt % based on total liquid phase weight. A particularly useful organoamino compound is tetraethylenepentamine, particularly when used with diutan viscosifying agent at temperatures of approximately 300° F. (150° C.).

Friction reducers may also be incorporated into fluids used in the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink under the trademarks "FLO 1003, 1004, 1005 & 1008" have also been found to be effective. These polymeric species added as friction reducers or viscosity index improvers may also act as fluid loss additives, reducing or even eliminating the need for conventional fluid loss additives.

Breakers, in addition to those described above, may optionally be used in some methods of the invention. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of such an acid, oxidizer, enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH will just as easily eliminate the borate/polymer bonds. At pH values at or above 8, the borate ion exists and is available to crosslink and cause gelling. At lower pH values, the borate is tied up by hydrogen and is not available for crosslinking, thus gelation caused by borate ion crosslinking is reversible. The breakers may include 0.1 pound (0.05 kg) to 20 pounds (9.1 kg) per thousand gallons (2785 liters) of conventional oxidizers such as ammonium persulfates, live or encapsulated, or potassium periodate, calcium peroxide, chlorites, and the like. In oil producing formations the film may be at least partially broken when contacted with formation fluids (oil), which may help de-stabilize the film.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are particularly useful. Fibers can be any fibrous material, such as, but not limited to, natural organic fibers, comminuted plant materials, synthetic polymer fibers (non-limiting examples including polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations of from about 1 to about 15 grams per liter of the liquid phase of the fluid, more particularly, the concentration of fibers may be from about 2 to about 12 grams per liter of liquid, and more particularly, from about 2 to about 10 grams per liter of liquid.

Embodiments of the invention may include other additives and chemicals that are known to be commonly used in oilfield applications by those skilled in the art. These include, but are not limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like.

Also, the fluids may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

Embodiments of the invention may also include placing proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, nut shells (such as walnut shells), sintered bauxite, glass beads, ceramic materials, naturally occurring materials, or similar materials. Mixtures of proppants can be used as well. If sand is used, it will typically be from about 20 to about 100 U.S. Standard Mesh (approx. 0.84 mm to 0.15 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and, as an example, may be in the range of from about 0.05 kilogram to about 3 kilograms of proppant added per liter of liquid phase. Also, any of the proppant particles can further be coated with a resin to potentially improve the strength, clustering ability, and flow back properties of the proppant.

Conventional propped hydraulic fracturing techniques, with appropriate adjustments if necessary, as will be apparent to those skilled in the art, are used in the methods of the invention. In an example of a fracture stimulation treatment, according to the present invention, the treatment may begin with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid, such as water or brine thickened with a viscoelastic surfactant or with a water soluble or dispersible polymer such as guar, hydroxypropylguar or the like. The pad and carrier fluids may contain various additives. Non-limiting examples are fluid loss additives, crosslinking agents, clay control agents, breakers, iron control agents, and the like, provided that the additives do not affect the stability or action of the fluid.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most, if not all, commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

In the fracturing treatment, fluids of the invention may be used in the pad treatment, the proppant stage, or both. The components of the liquid phase may be mixed on the surface. Alternatively, a the fluid may be prepared on the surface and pumped down tubing while the gas component could be pumped down the annular to mix down hole, or vice versa.

Yet another embodiment of the invention includes the use fluids based on the invention for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup as energized fluids, the fluids of the invention may effective for use in cleanup operations, with or without a breaker.

In another embodiment, the present invention relates to use of fluids based on the invention for gravel packing a wellbore. As a gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh (2.38 mm-0.21 mm).

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

The following examples serve to further illustrate the invention.

EXAMPLES

In the examples, the following surfactants composition were evaluated:
Surfactant A: 30 wt % sodium tridecyl ether sulfate, 7.9 wt % isopropanol, 62.1 wt % water, available as RHODAPEX® EST-30/I from Rhodia, Inc. Cranbury, N.J.
Surfactant B: 50 wt % ammonium C6-C10 alcohol ethoxysulfate, 13.2 wt % ethanol, 12 wt % propylene glycol, 0.8 wt % C6-C10 ethoxylated alcohol, 25 wt % water.
Surfactant C: 30 wt % amphoteric alkyl amine, 10 wt % isopropanol, 60 wt % water.
Surfactant D: 30 wt % sodium lauryl sulfate, 70 wt % water.

Surfactant A is one example of a surfactant useful in the invention. The benefits of this surfactant are illustrated through the examples described below. Surfactants B, C and D were the foaming agents used for comparison purposes. Surfactant B, is a $C_6$-$C_{10}$ alcohol ethoxysulfate, and is a common surfactant which is widely used for both $N_2$ and $CO_2$ foamed fluids. It can provide good foam stability up to 120° C. in $N_2$ foams with gelling agents such as guar. For $CO_2$ foams at temperatures such as 95° C. to 120° C., Surfactant C, an amphoteric alkyl amine, is often used to provide relatively stable foams. Surfactant D is a $C_{12}$ sulfate surfactant.

All the foamed fluid viscosity measurements were performed on a fully automated high-pressure-high-temperature capillary rheometer, a Chandler-Schlumberger Foam Rheometer System. Details of the operation of this equipment are reported in Hutchins, R. D. and Miller, M. J., A Circulating Foam Loop for Evaluating Foam at Conditions of Use, SPE paper 80242. SPE International Symposium on Oilfield Chemistry. Houston, USA 5-7 Feb. 2003. The gas/liquid composition of the energized fluid was verified through the measured density.

Example 1

Guar-based fluids energized with $N_2$ were tested using Surfactants A and B at approximately 120° C. These energized fluids contained 0.6 wt % guar, 1.0 vol % surfactant A or B, and 0.1 wt % tetramethyl ammonium chloride, in aqueous solutions. Guar was added in a slurry form in which guar and diesel solvent each accounted for 50 wt % of the slurry. Foam quality was 70%, and the temperature was constant at about 120° C. The viscosity was measured at 100 s$^{-1}$. The results are shown in FIG. 1, and indicate that Surfactant A provides better foam stability compared with Surfactant B at 120° C. in $N_2$ foams. The sample using Surfactant A contained less active surfactant as compared with Surfactant B (30 wt % vs. 50 wt %) but the viscosity was approximately 35% greater for that for the sample using Surfactant B.

Example 2

Figure 2:
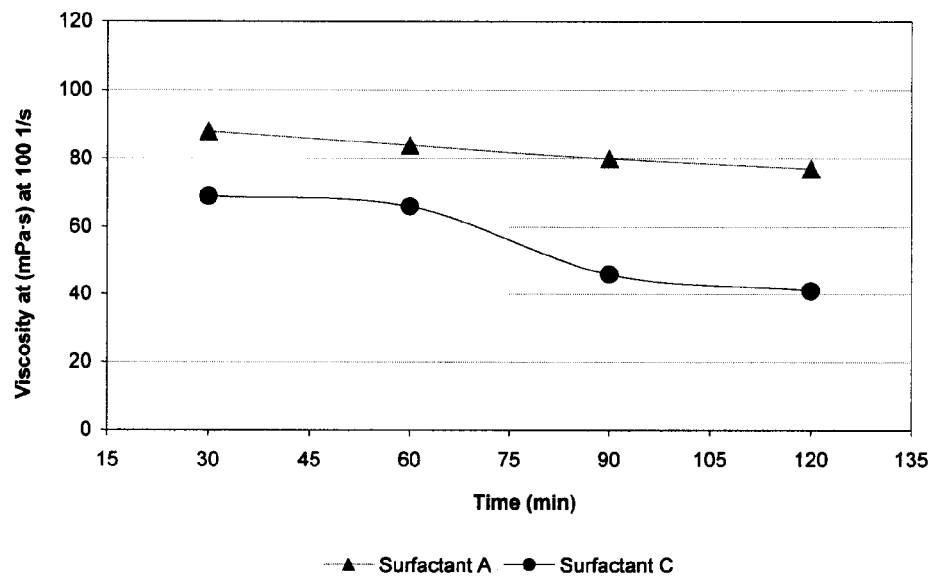
FIG. 2 shows the viscosities over time of $CO_2$ foamed guar-based fluids at about 120° C. containing either Surfactant A or Surfactant C (an amphoteric alkyl amine containing surfactant)

Guar-based fluids foamed with $CO_2$ were tested using Surfactants A and C at approximately 120° C. The fluids contained 0.6 wt % guar, 1.0 vol % Surfactant A or C, and 0.1 wt % tetramethyl ammonium chloride. The results are presented in FIG. 2. FIG. 2 shows that Surfactant A provides significantly better foam stability compared with Surfactant C at 120° C. in $CO_2$ foams. It can be seen that the foam viscosity measured at 100 s$^{-1}$ by using Surfactant C fell below 50 mPa·s after 75 min. It is commonly accepted that 50 mPa·s is the minimum viscosity for fracturing applications. With Surfactant A, much greater viscosity was achieved even after 2 hours. Foam quality was 70%, and the temperature was constant at about 120° C.

Example 3

Figure 3:
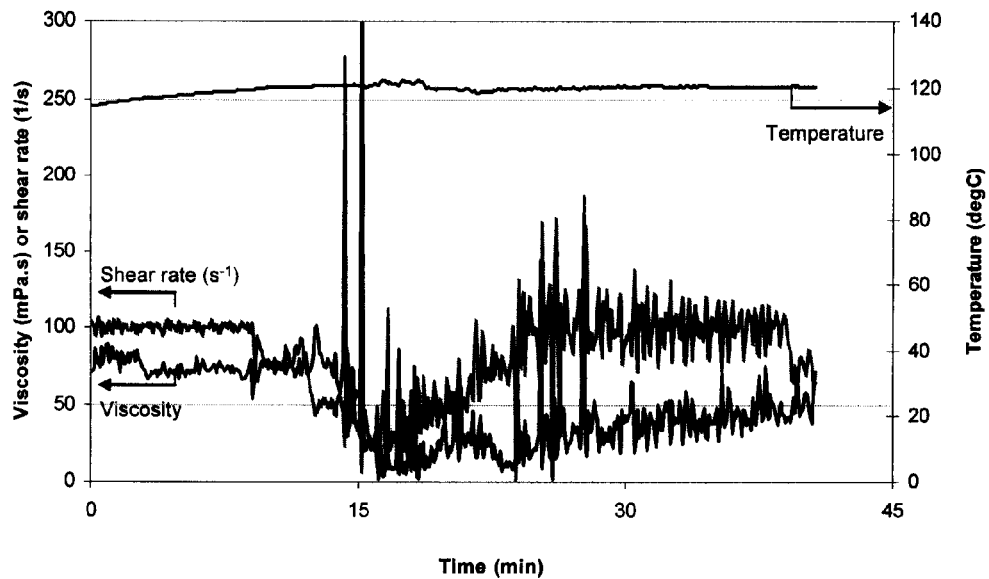
FIG. 3 shows the viscosity over time of a $N_2$ foamed guar-based fluid at about 120° C. containing Surfactant D (a sodium lauryl sulfate containing surfactant)

A guar-based fluid foamed with $N_2$ was tested using Surfactant D at approximately 120° C. The fluid contained 0.36 wt % guar, 1.0 vol % Surfactant D, and 0.1 wt % tetramethyl ammonium chloride. Guar was added in a slurry form in which guar and mineral oil each accounted for 50 wt % of the slurry. Foam quality was approximately 70% at time 0 min. The density and shear rate fluctuated as a result of the instable foam. The results are presented in FIG. 3. FIG. 3 illustrates that Surfactant D, a $C_{12}$ sulfate, was unable to create a stable foam at 120° C. in $N_2$ foams, and may suggest that the ethylene oxide units in Surfactant A may play an important role in providing greater foam stability. At the same gel loading, Surfactant A maintained the foam viscosity above 50 mPa·s at 100 s$^{-1}$ for over 2 hours (see in FIG. 8).

Example 4

Figure 4:
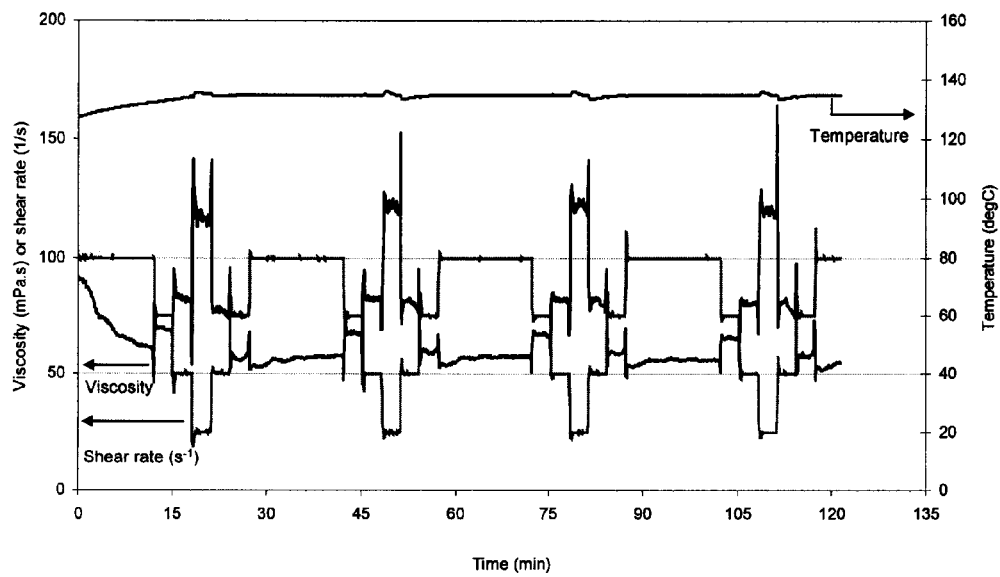
FIG. 4 shows the viscosity over time of a $CO_2$ foamed guar-based fluid containing Surfactant A at a temperature of about 135° C.

A guar-based fluid foamed with $CO_2$ containing Surfactant A was tested at a temperature of about 135° C. The fluid contained 0.36 wt % guar, 1.5 vol % Surfactant A, and 0.1 wt % tetramethyl ammonium chloride. Guar was added in a slurry form in which guar and mineral oil each accounted for 50 wt % of the slurry. Foam quality was 70%. The results are presented in FIG. 4. As can be seen from FIG. 4, Surfactant A can extend the temperature limit of conventional guar-based fluids from 120° C. to 135° C. in $CO_2$ foams. The viscosity of the foamed fluid was stable with values above 50 mPa·s at 100 s$^{-1}$. It was also noted that the fluid stability was maintained at 135° C. without any temperature stabilizer, which is commonly required at elevated temperatures, i.e., temperatures above 93° C. The surfactant thus extended the temperature limit of the foam.

Example 5

Figure 5:
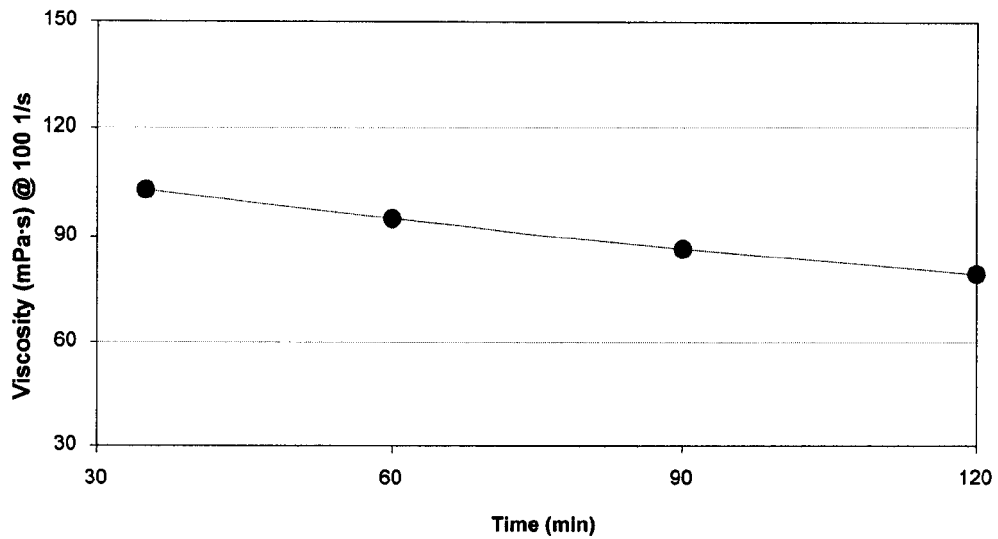
FIG. 5 shows the viscosity over time of a $CO_2$ foamed diutan-based fluid containing Surfactant A at a temperature of about 150° C.

A diutan-based fluid foamed with $CO_2$ containing Surfactant A was tested at a temperature of about 150° C. The energized fluid contained 0.36 wt % diutan gum, 1.5 vol % Surfactant A, 7 wt % potassium chloride, and 0.5 vol % tetraethylene pentamine. Diutan was added in a slurry form that comprised 38 wt % diutan, 61 wt % 2-butoxyethanol, and 1% suspension agent. The foam quality was 71%, and the temperature was constant at about 150° C. The results are presented in FIG. 5. FIG. 5 demonstrates that Surfactant A is able to provide a stable $CO_2$ foam at temperatures as high as about 150° C. A temperature stabilizer, tetraethylenepentamine, was added to the fluid to prevent the polymer from degrading at high temperatures.

Example 6

Figure 6:
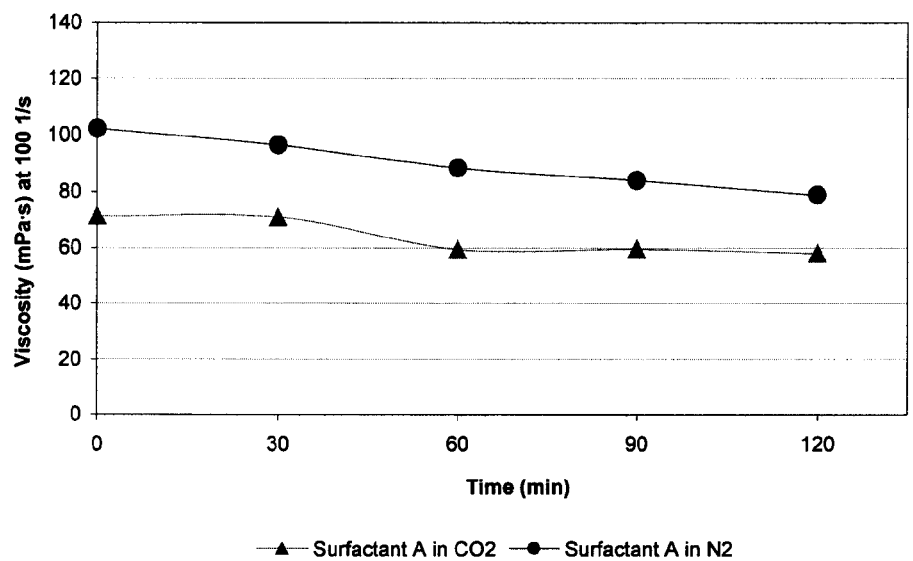
FIG. 6 shows the viscosities over time of $CO_2$ and $N_2$ foamed carboxymethyl hydroxypropylguar (CMHPG)-based fluids containing Surfactant A at temperatures of about 120° C.

Surfactant A was evaluated with carboxymethyl hydroxypropyl guar (CMHPG) based fluids at high temperatures. CMHPG-based fluids foamed with $CO_2$ and $N_2$ containing Surfactant A were tested at a temperatures of about 120° C. The gelling agent was CMHPG added at 0.60 wt %, 1.5 vol % surfactant A, and 0.1 wt % tetramethyl ammonium chloride. CMHPG was added in a slurry form in which the polymer and mineral oil each accounted for approximately 50 wt % of the slurry. The foam quality was 70%. The results are presented in FIG. 6. FIG. 6 shows that Surfactant A can provide viscosities greater than 50 mPa·s at $100 \, s^{-1}$ at 120° C. in either $CO_2$ or $N_2$ foams. It should be noted that the fluid did not contain any temperature stabilizer, which is commonly required at this temperature for guar or CMHPG based fluids.

Example 7

Figure 7:
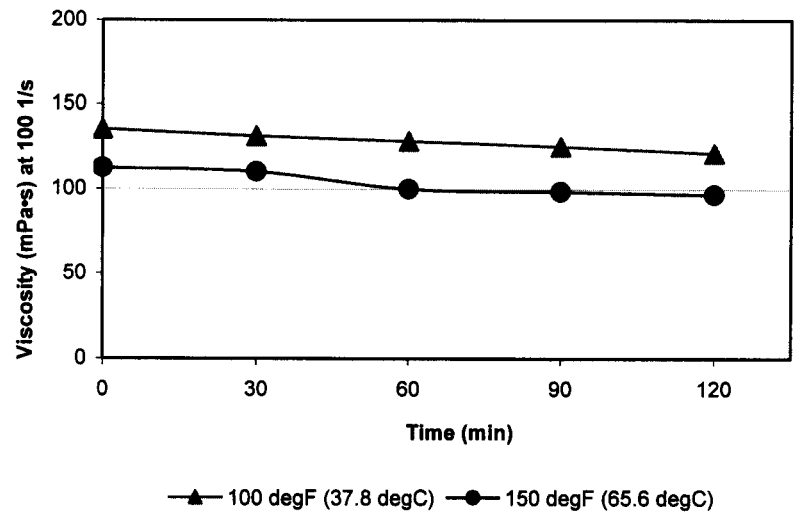
FIG. 7 shows the viscosities over time of a $N_2$ foamed guar-based fluid containing Surfactant A at temperatures of about 100° F. (38° C.) and 150° F. (66° C.)

In addition to its excellent performance at high temperatures, Surfactant A also functioned as a good foaming agent at temperatures lower than 120° C. Surfactant A was used in guar-based fluids foamed with $N_2$ at 100° F. (38° C.) and 150° F. (66° C.). The fluids contained 0.24 wt % guar, 0.5 vol % Surfactant A, and 0.1 wt % tetramethyl ammonium chloride. The foam quality was 70% and the temperature was constant at either 100° F. (38° C.) or 150° F. (66° C.). The results are seen in FIG. 7. The guar polymer used was delivered in the form of an environmentally friendly or "green" slurry in which the polymer and mineral oil each accounted for approximately 50 wt % of the slurry.

Example 8

Figure 8:
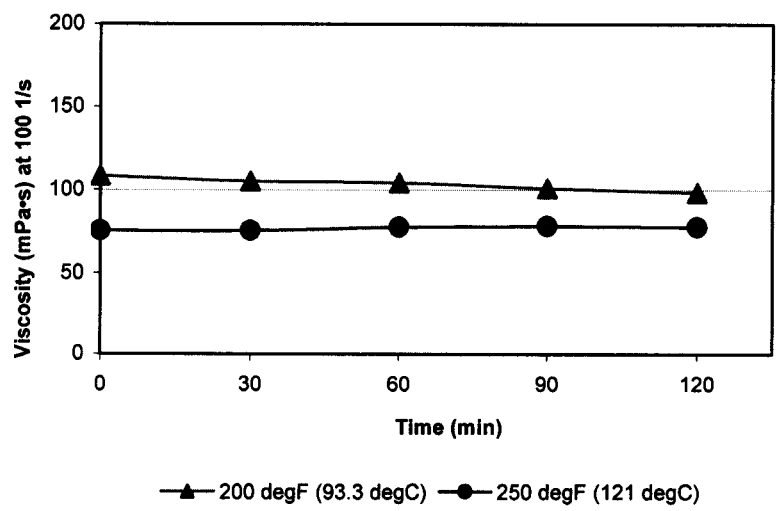
FIG. 8 shows the viscosities over time of a $N_2$ foamed guar-based fluid containing Surfactant A at temperatures of about 200° F. (93.3° C.) and 250° F. (121° C.)

Surfactant A was used in guar-based fluids foamed with $N_2$ at 200° F. (93.3° C.) and 250° F. (121° C.). The fluids contained 0.36 wt % guar, 1.0 vol % Surfactant A, and 0.1 wt % tetramethyl ammonium chloride. The foam quality was 70% and the temperature was constant at either 200° F. (93.3° C.) or 250° F. (121° C.). The results are seen in FIG. 8. The guar polymer was added as a slurry in mineral oil in which the polymer and mineral oil each accounted for approximately 50 wt % of the slurry.

Example 9

Figure 9:
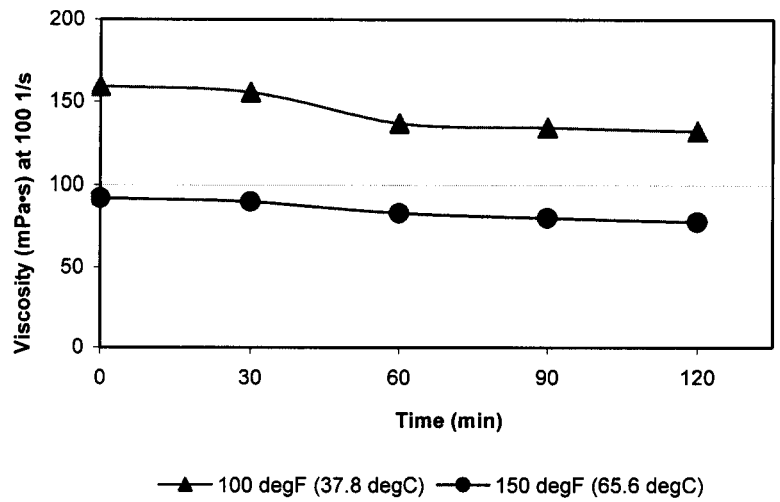
FIG. 9 shows the viscosities over time of a $CO_2$ foamed guar-based fluid containing Surfactant A at temperatures of about 100° F. (38° C.) and 150° F. (66° C.)

Surfactant A was used in guar-based fluids foamed with $CO_2$ at 100° F. (38° C.) and 150° F. (66° C.). The fluids contained 0.24 wt % guar, 0.5 vol % Surfactant A, and 0.1 wt % tetramethyl ammonium chloride. The foam quality was 67% at 100° F. (38° C.) and 70% at 150° F. (66° C.). The results are seen in FIG. 9. The guar polymer was added as a slurry in mineral oil in which the polymer and mineral oil each accounted for approximately 50 wt % of the slurry.

Example 10

Figure 10:
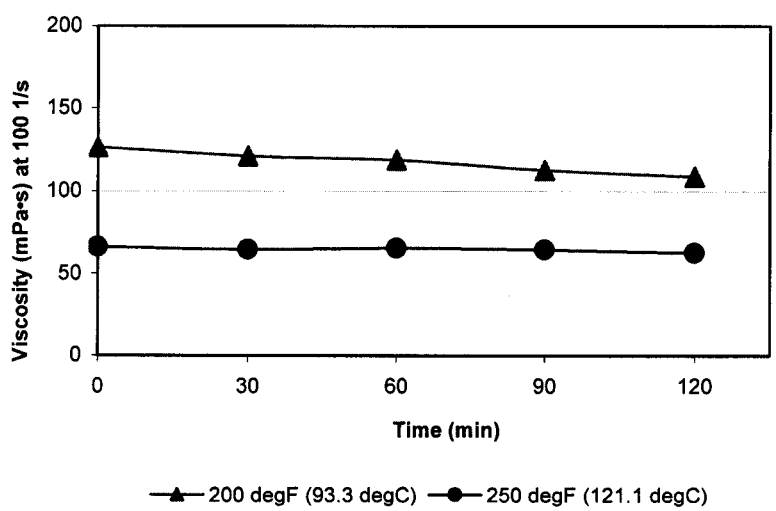
FIG. 10 shows the viscosities over time of a $CO_2$ foamed guar-based fluid containing Surfactant A at temperatures of about 200° F. (93.3° C.) and 250° F. (121° C.)

Surfactant A was used in guar-based fluids foamed with $CO_2$ at 200° F. (93.3° C.) and 250° F. (121° C.). The fluids contained 0.36 wt % guar, 1.0 vol % Surfactant A, and 0.1 wt % tetramethyl ammonium chloride. The foam quality was 70% and the temperature was constant at either 200° F. (93.3° C.) or 250° F. (121° C.). The results are seen in FIG. 10. The guar polymer was added as a slurry in mineral oil in which the polymer and mineral oil each accounted for approximately 50 wt % of the slurry.

As can be seen from Examples 7 through 10, foam viscosities of much greater than 50 mPa·s at $100 \, s^{-1}$ can be obtained with guar-based fluids containing Surfactant A over a range of temperatures, regardless of the gas type used.

Example 11

Figure 11:
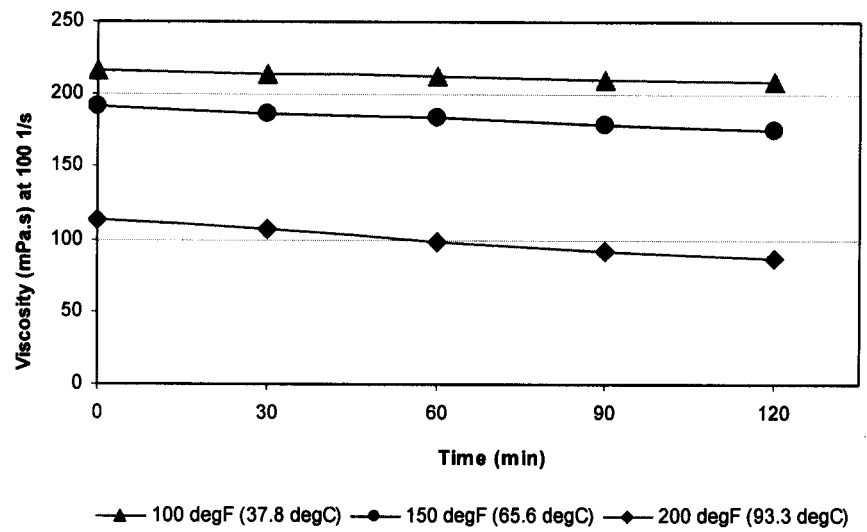
FIG. 11 shows the viscosities over time of $N_2$ foamed CMHPG-based fluids containing Surfactant A at temperatures of about 100° F. (38° C.), 150° F. (66° C.) and 200° F. (93.3° C.)

Surfactant A was used in CMHPG-based fluids foamed with $N_2$ at 100° F. (38° C.), 150° F. (66° C.) and 200° F. (93.3° C.). The fluids contained 0.36 wt % CMHPG, 1.0 vol % Surfactant A, and 0.1 wt % tetramethyl ammonium chloride. The foam quality was 70% and the temperature was constant at either 100° F. (38° C.), 150° F. (66° C.) or 200° F. (93.3° C.). The results are seen in FIG. 11. The CMHPG polymer used was delivered in the form of a "green" slurry in which the polymer and mineral oil each accounted for approximately 50 wt % of the slurry.

Example 12

Figure 12:
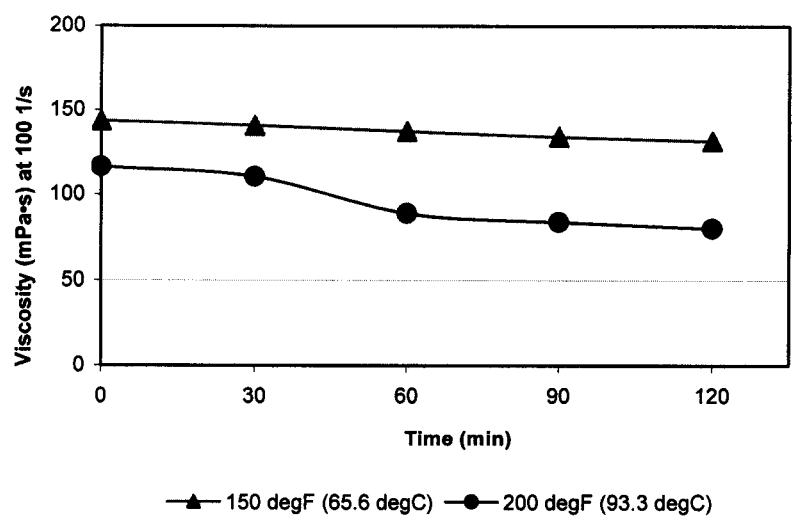
FIG. 12 shows the viscosities over time of $CO_2$ foamed CMHPG-based fluids containing Surfactant A at temperatures of about 150° F. (66° C.) and 200° F. (93.3° C.)

Surfactant A was used in CMHPG-based fluids foamed with $CO_2$ at 150° F. (66° C.) and 200° F. (93.3° C.). The fluids contained 0.36 wt % CMHPG, 1.0 vol % Surfactant A, and 0.1 wt % tetramethyl ammonium chloride. The foam quality was 70% and the temperature was constant at either 150° F. (66° C.) or 200° F. (93.3° C.). The results are seen in FIG. 12. The CMHPG polymer used in these experiments was delivered in the form of a "green" slurry in which the polymer and mineral oil each accounted for approximately 50 wt % of the slurry.

As can be seen from Examples 11 and 12, in addition to its good foaming properties in guar-based fluids, Surfactant A can also generate stable foams in CMHPG-based fluids at various temperatures.

Example 13

Figure 13:
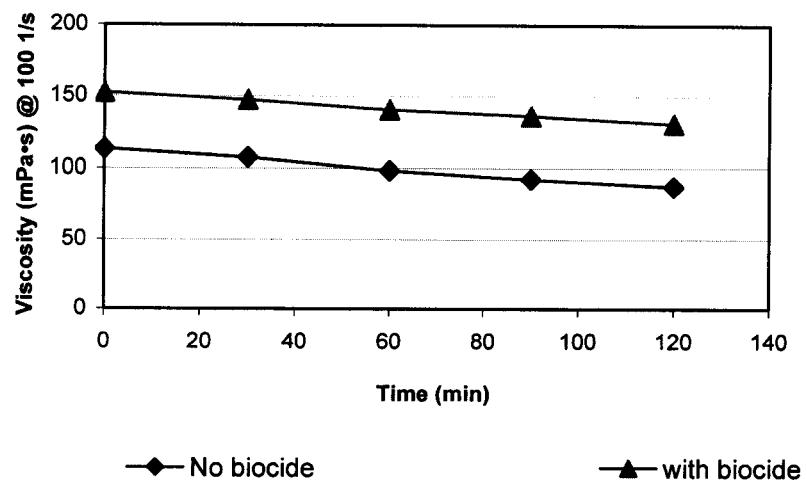
FIG. 13 shows the viscosities over time of $N_2$ foamed CMHPG-based fluids containing Surfactant A at a temperature of about 200° F. (93.3° C.), with and without the use of a biocide.

It was discovered that energized fluid viscosity of a CMHPG-based fluid may increased with a small amount of a biocide. Surfactant A was used in CMHPG-based fluids foamed with $N_2$ at 200° F. (93.3° C.). The fluids contained 0.36 wt % CMHPG, 1.0 vol % Surfactant A, and 0.1 wt % tetramethyl ammonium chloride. The foam quality was 70%. and the temperature was constant at around 200° F. (93.3° C.). The CMHPG polymer used in these experiments was delivered in the form of a "green" slurry in which the polymer and mineral oil each accounted for approximately 50 wt % of the slurry. In one fluid sample, no biocide was used. In the other sample, a biocide was used in which the biocide contained 9 wt % 1,2-benzisothiazolin-3-one and 3.5 wt % sodium hydroxide, 43 wt % propane-1,2-diol, in an aqueous solution, all based upon total weight of the biocide solution. The results are presented in FIG. 13.

Example 14

Surfactant A was used in CMHPG-based fluids foamed with $CO_2$ at 200° F. (93.3° C.). The fluids contained 0.36 wt %

Figure 14:
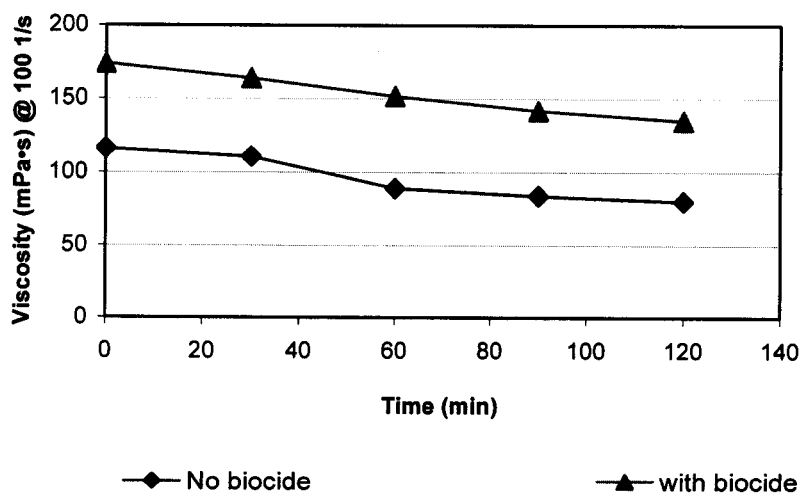
FIG. 14 shows the viscosities over time of $CO_2$ foamed CMHPG-based fluids containing Surfactant A at a temperature of about 200° F. (93.3° C.), with and without the use of a biocide composed of 9 wt % 1,2-benzisothiazolin-3-one and 3.5 wt % sodium hydroxide, 43 wt % propane-1,2-diol, in an aqueous solution.

CMHPG, 1.0 vol % Surfactant A, and 0.1 wt % tetramethyl ammonium chloride. The foam quality was 70%. and the temperature was constant at around 200° F. (93.3° C.). The CMHPG polymer used in these experiments was delivered in the form of a "green" slurry in which the polymer and mineral oil each accounted for approximately 50 wt % of the slurry. In one fluid sample no biocide was used. In the other sample, a biocide was used in which the biocide contained 9 wt % 1,2-benzisothiazolin-3-one and 3.5 wt % sodium hydroxide, 43 wt % propane-1,2-diol, in an aqueous solution, all based upon total weight of the biocide solution. The results are presented in FIG. 14.

Example 15

Figure 15:
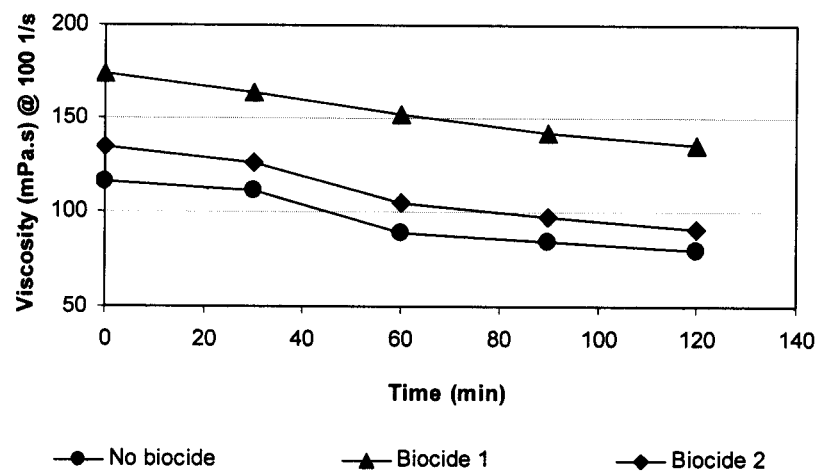
FIG. 15 shows the viscosities over time of $CO_2$ foamed CMHPG-based fluids containing Surfactant A at a temperature of about 200° F. (93.3° C.), with and without the use of a Biocide 1 (composed of 42.5 wt % propane-1,2-diol, 2 to 5 wt % sodium hydroxide, 9 wt % 1,2-benziisothiazolin-3-one, and 43.5 to 46.5 wt % water) and Biocide 2 (composed of 1 to 5 wt % 2-bromo-3-nitrilopropionamide and 60 to 100 wt % 2,2-dibromo-3-nitrilopropionamine)

Different biocides were used with Surfactant A. The biocides used were as follows:
Biocide 1: 42.5 wt % propane-1,2-diol, 2 to 5 wt % sodium hydroxide, 9 wt % 1,2-benziisothiazolin-3-one, and 43.5 to 46.5 wt % water.
Biocide 2: 1 to 5 wt % 2-bromo-3-nitrilopropionamide and 60 to 100 wt % 2,2-dibromo-3-nitrilopropionamine.
Viscosified fluids with and without Biocides 1 and 2 were prepared using a $CO_2$ foamed fluid containing 0.36 wt % CMHPG, 1.0 vol % Surfactant A and 0.1 wt % tetramethyl ammonium chloride. The foam quality was 70% and the temperature was constant at about 200° F. (93.3.° C.). The results are presented in FIG. 15.

Example 16

Figure 16:
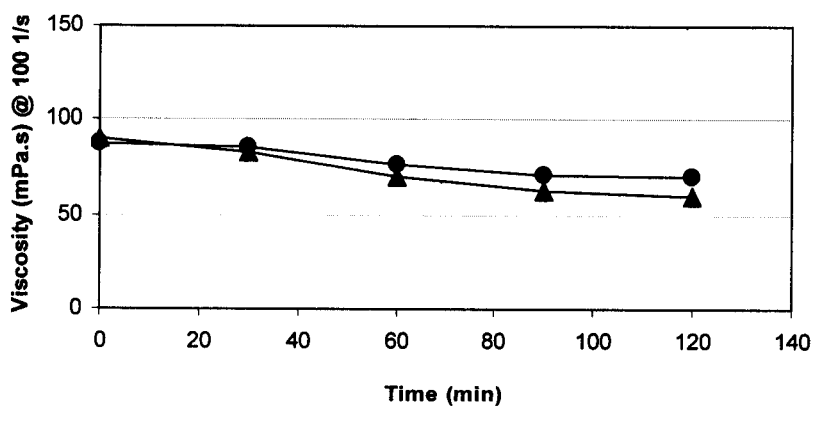
FIG. 16 shows the viscosities over time of $CO_2$ foamed CMHPG-based fluids containing Surfactant B at a temperature of about 200° F. (93.3° C.), with and without the use of Biocide 1.

It was found that the viscosity enhancements induced by biocides may be unique to the particular surfactant used. Viscosified fluids with and without Biocide 1 were prepared using a $CO_2$ foamed fluid containing 0.36 wt % CMHPG, 1.0 vol % Surfactant B and 0.1 wt % tetramethyl ammonium chloride. The foam quality was 70% and the temperature was constant at about 200° F. (93.3.° C.). The results are presented in FIG. 16. As can be seen from FIG. 16, there was little viscosity change when Biocide 1 was used in combination with the fluid containing Surfactant B.

Example 17

Figure 17:
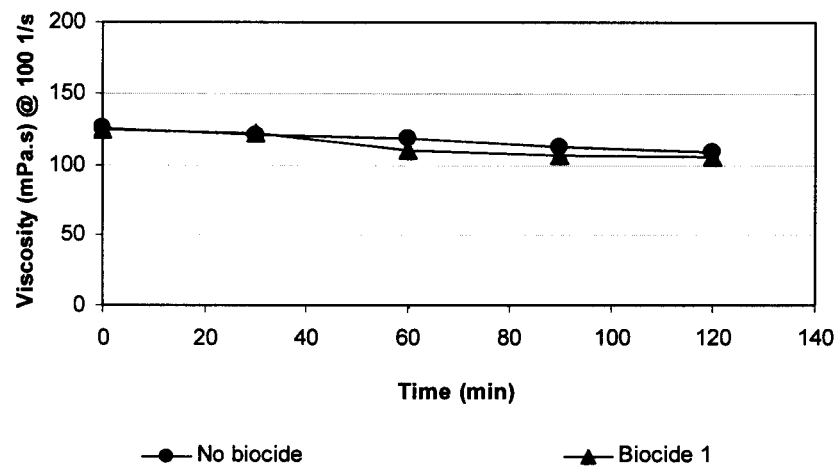
FIG. 17 shows the viscosities over time of $CO_2$ foamed guar-based fluids containing Surfactant A at a temperature of about 200° F. (93.3° C.), with and without the use of Biocide 1.
Figure 18:
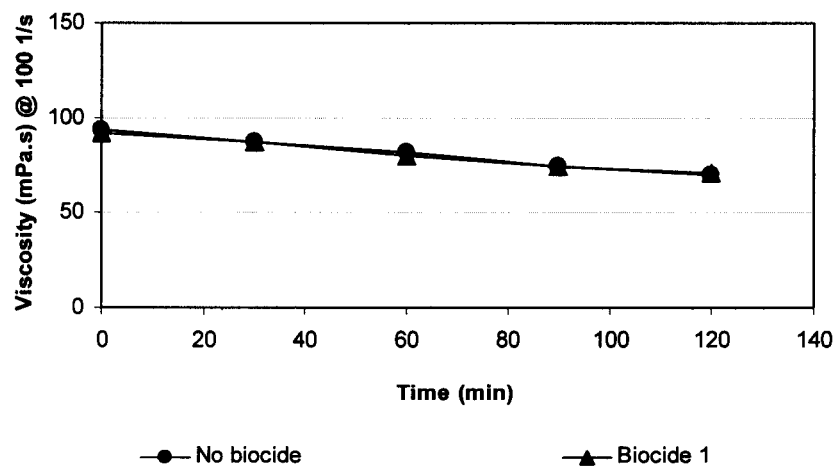
FIG. 18 shows the viscosities over time of $CO_2$ foamed guar-based fluids containing Surfactant B at temperatures of about 200° F. (93.3° C.), with and without the use of Biocide 1.

When biocides are used, the type of polymer used may also have an effect. Viscosified fluids with and without Biocide 1 were prepared using a $CO_2$ foamed fluids containing 0.36 wt % guar and 0.1 wt % tetramethyl ammonium chloride. Surfactants A and B were used in each of these fluids in an amount of 1.0 vol %. The foam quality for the fluids was 70% and the temperature was constant at about 200° F. (93.3.° C.). The results of those fluids employing Surfactant A are presented in FIG. 17. The results of those fluids employing Surfactant B are presented in FIG. 18. As can be seen from FIGS. 17 and 18, there was no viscosity increase when guar was used in combination with the fluids containing either Surfactant A or B. This may be due to the fact that guar is non-ionic, whereas CMHPG is anionic and may interact with the biocide to increase its viscosity.

Example 18

Figure 19:
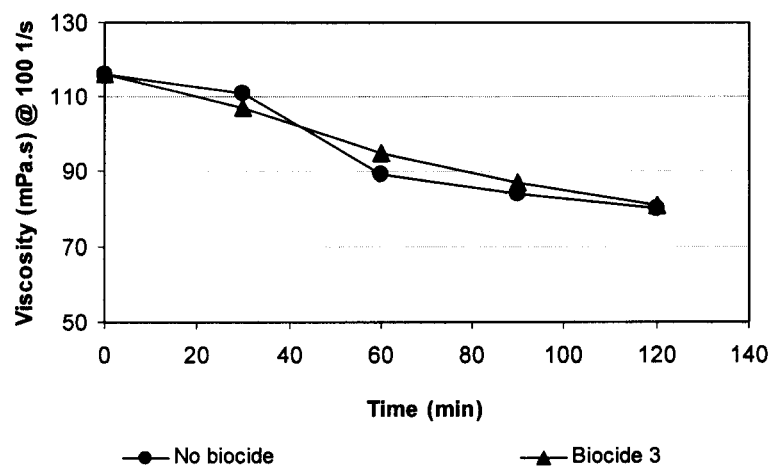
FIG. 19 shows the viscosities over time of $CO_2$ foamed CMHPG-based fluids containing Surfactant A at a temperature of about 200° F. (93.3° C.), with and without the use of Biocide 3 (composed of 25 wt % glutaraldehyde and 75 wt % water).

A glutaraldehyde biocide (Biocide 3) was used in combination with Surfactant A. Biocide 3 contained 25 wt % glutaraldehyde and 75 wt % water. Viscosified fluids with 0.2 vol % Biocide 3 and without Biocide 3 were prepared using a $CO_2$ foamed fluids containing 0.36 wt % CMHPG and 0.1 wt % tetramethyl ammonium chloride. Surfactant A was used in each of these fluids in an amount of 1.0 vol %. The foam quality for the fluids was 70% and the temperature was constant at about 200° F. (93.3.° C.). The results are presented in FIG. 19. As can be seen from FIG. 19, there was no viscosity increase when Biocide 3 was used in combination with Surfactant A.

Example 19

Field tests were conducted wherein ten fracturing treatments were performed using Surfactant A as the foaming agent under various conditions. The reservoir bottom hole static temperatures ranged from 160° F. (71° C.) to 200° F. (93° C.). The gas phase of the foamed fluids was carbon dioxide and the base fluids included non-crosslinked guar fluid, boron crosslinked guar gel and titanium crosslinked guar fluid. All ten treatments were pumped as designed and showed that Surfactant A was an effective foaming agent for fracturing fluids.

Although the methods have been described herein for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A wellbore treatment fluid comprising an aqueous medium, a gas component, a viscosifying agent, an alcohol, and a surfactant, wherein the surfactant is represented by the chemical formula:

$$[R-(OCH_2CH_2)_m-O_q-YO_n]_pX$$

wherein R is a linear alkyl, branched alkyl, alkyl cycloaliphatic, or alkyl aryl group; O is an oxygen atom; Y is either a sulfur or phosphorus atom; m is 1 or more; n is an integer ranging from 1 to 3; p is an integer ranging from 1 to 4; q is an integer ranging from 0 to 1; and X is a cation, wherein said gas component forms an energized fluid or foam in said aqueous medium.

2. The fluid of claim 1, wherein the alcohol is isopropyl alcohol.

3. The fluid of claim 1, wherein R is a linear alkyl, branched alkyl, alkyl cycloaliphatic, or alkyl aryl group containing from about 10 to about 20 carbon atoms.

4. The fluid of claim 1, wherein m is an integer ranging from 1 to about 6.

5. The fluid according to claim 1, wherein the surfactant comprises sodium tridecyl ether sulfate, as represented by the following structure:

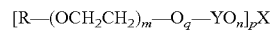

wherein m ranges from 1 to about 6.

6. The fluid according to claim 1, wherein the surfactant is comprised of a mixture of sodium dodecyl ether sulfate and sodium tetradecyl ether sulfate, as represented by the following structures:

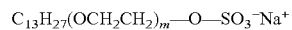

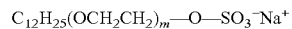

wherein m ranges from 1 to about 6.

7. The fluid according to claim 1, wherein the viscosifying agent is selected from guar or a guar derivative, hydroxypropylguar, carboxymethyl guar, carboxymethylhydroxypropyl guar, cationic guar or hydrophobically modified guar or a combination of these.

8. The fluid according to claim 1, wherein the viscosifying agent is diutan gum having a tetrasaccharide repeating unit in the polymer backbone as represented by the chemical formula:

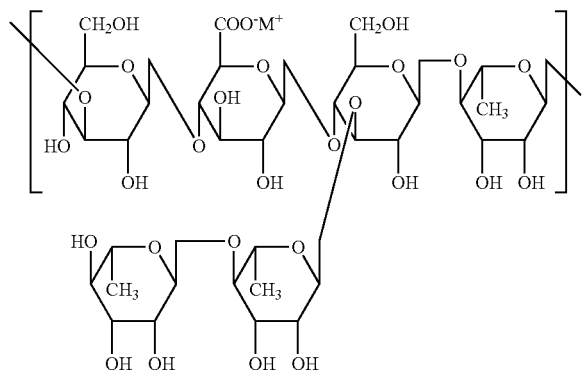

wherein $M^+$ is an ionic species, and wherein the weight average molecular weight (Mw) is from about $10^5$ to about $10^7$.

9. The fluid according to claim 1, wherein the viscosifying agent is selected from the group consisting of natural polymers, derivatives of natural polymers, synthetic polymers, associative polymers, and biopolymers.

10. The fluid according to claim 1, wherein the surfactant is incorporated in an amount of from about 0.02 wt % to about 5 wt % of total liquid phase weight.

11. The fluid according to claim 1, wherein the fluid further comprises an electrolyte selected from the group consisting of organic acids, organic acid salts, inorganic salts, and combinations of one or more organic acids or organic acid salts with one or more inorganic salts, and the electrolyte is incorporated in an amount of from about 0.01 wt % to about 12.0 wt % of the total liquid phase weight.

12. The fluid according to claim 1, wherein the gas component comprises a gas selected from the group consisting of nitrogen, carbon dioxide, air and any mixtures thereof.

13. The fluid according to claim 1, wherein said gas component comprises from about 10% to about 90% of total fluid volume percent.

14. The fluid according to claim 1, further comprising a proppant.

15. The fluid according to claim 14, wherein the proppant is selected from the group consisting of sand, nut shells, sintered bauxite, glass beads, ceramic materials, resin coated proppant, naturally occurring materials, or any mixtures thereof.

16. The fluid according to claim 1, further comprising a crosslinker containing a metal ion selected from the group consisting of chromium, iron, boron, titanium, and zirconium.

17. The fluid according to claim 1, further comprising a breaker.

18. The fluid according to claim 1, further comprising a temperature stabilizer.

19. The fluid according to claim 1, further comprising an organoamino compound selected from the group consisting of tetraethylenepentamine, triethylenetetramine, pentaethylenehexamine, triethanolamine, and any mixtures thereof, and the organoamino compound is incorporated in an amount from about 0.01 wt % to about 2.0 wt % based on total liquid phase weight.

20. The fluid according to claim 1, further comprising a fiber component.

* * * * *